(12) United States Patent
Huynh

(10) Patent No.: US 9,022,336 B2
(45) Date of Patent: May 5, 2015

(54) SWITCH PLATE ADAPTER

(71) Applicant: Kevin Chi Huynh, New York, NY (US)

(72) Inventor: Kevin Chi Huynh, New York, NY (US)

( * ) Notice: Subject to any disclaimer, the term of this patent is extended or adjusted under 35 U.S.C. 154(b) by 0 days.

(21) Appl. No.: 13/758,003

(22) Filed: Feb. 4, 2013

(65) Prior Publication Data

US 2014/0217250 A1  Aug. 7, 2014

(51) Int. Cl.
  *F16B 45/00* (2006.01)
  *H02G 3/14* (2006.01)
  *A47G 29/10* (2006.01)

(52) U.S. Cl.
  CPC . *H02G 3/14* (2013.01); *A47G 29/10* (2013.01)

(58) Field of Classification Search
  CPC ................................ H02G 3/14; A47G 29/10
  USPC ......... 248/205.2, 205.3, 206.5, 301; 220/241; D8/351, 353
  See application file for complete search history.

(56) References Cited

U.S. PATENT DOCUMENTS

| | | | |
|---|---|---|---|
| 3,840,692 A * | 10/1974 | Wells ............................... | 174/66 |
| 3,953,933 A * | 5/1976 | Goldstein .................. | 40/642.02 |
| D327,213 S | 6/1992 | Murphy | |
| 5,457,286 A | 10/1995 | Flasz | |
| 5,669,515 A | 9/1997 | Tisbo et al. | |
| 5,675,125 A * | 10/1997 | Hollinger ........................ | 174/66 |
| 6,036,536 A * | 3/2000 | Chiu ............................. | 439/536 |
| 6,130,384 A * | 10/2000 | Esteves et al. .................. | 174/66 |
| D444,377 S | 7/2001 | Harvey | |
| D493,093 S | 7/2004 | Goodman et al. | |
| 6,910,667 B2 * | 6/2005 | O'Leary et al. ............ | 248/205.3 |
| D633,775 S * | 3/2011 | Chen et al. ..................... | D8/352 |
| D633,776 S * | 3/2011 | Chan .............................. | D8/352 |
| D653,522 S * | 2/2012 | Anzalone et al. ............. | D8/353 |
| 8,247,693 B2 * | 8/2012 | Gober ............................ | 174/66 |
| 2005/0109528 A1 * | 5/2005 | Mallen ............................ | 174/66 |
| 2005/0257951 A1 | 11/2005 | Xu et al. | |
| 2008/0197246 A1 * | 8/2008 | Belden ....................... | 248/176.1 |
| 2009/0180274 A1 | 7/2009 | Glazner et al. | |
| 2010/0258332 A1 * | 10/2010 | Yarborough .................... | 174/66 |

OTHER PUBLICATIONS http://www.thegreenhead.com/2012/02/switch-hooks-light-switch-cover-with-key-hooks.php.
http://www.amazon.com/plate-hookr-single-switch-hooks/dp/b003fw8OIK/ref.
http://ecx-images-amazon.com/images/I51OEq99Sj8L.__SL500__AA300__.jpg.

* cited by examiner

*Primary Examiner* — Gwendolyn W Baxter
(74) *Attorney, Agent, or Firm* — Mitchell J. Mehlman, Esq.

(57) ABSTRACT

Switch plate adapters comprising a body, at least one aperture and at least one hook for permanent or temporary attachment to existing switch plate covers are provided.

2 Claims, 4 Drawing Sheets

FIG. 2
FIG. 3
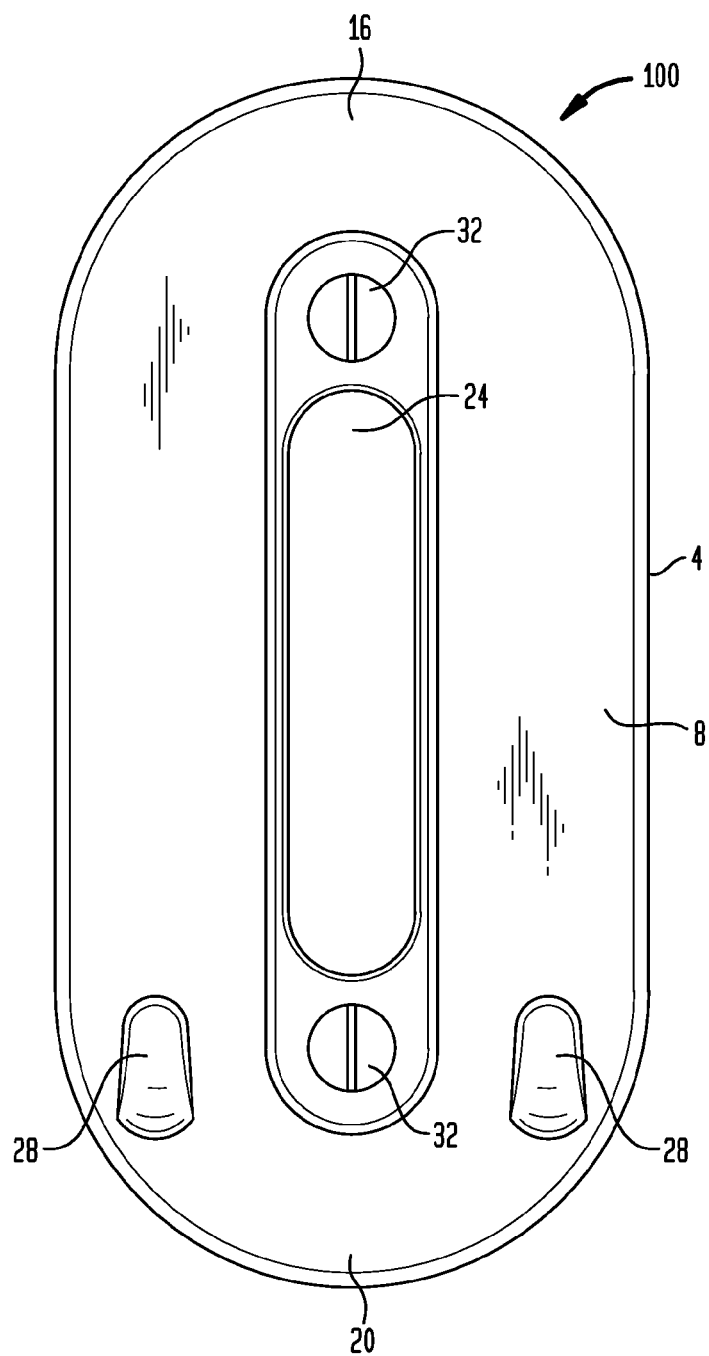
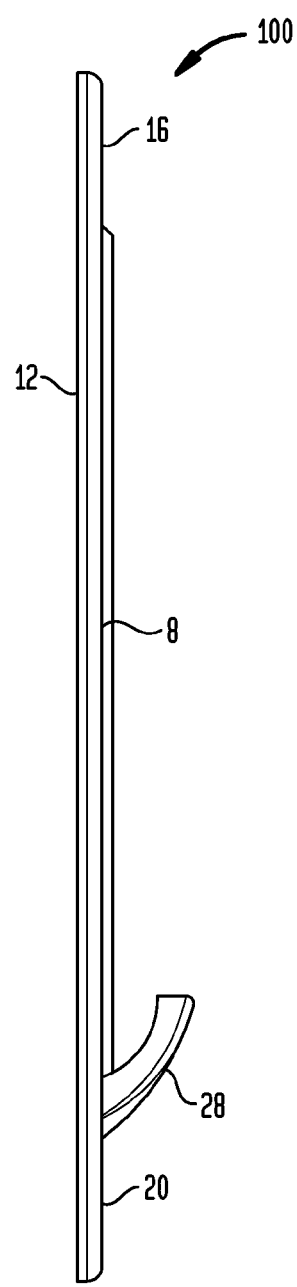

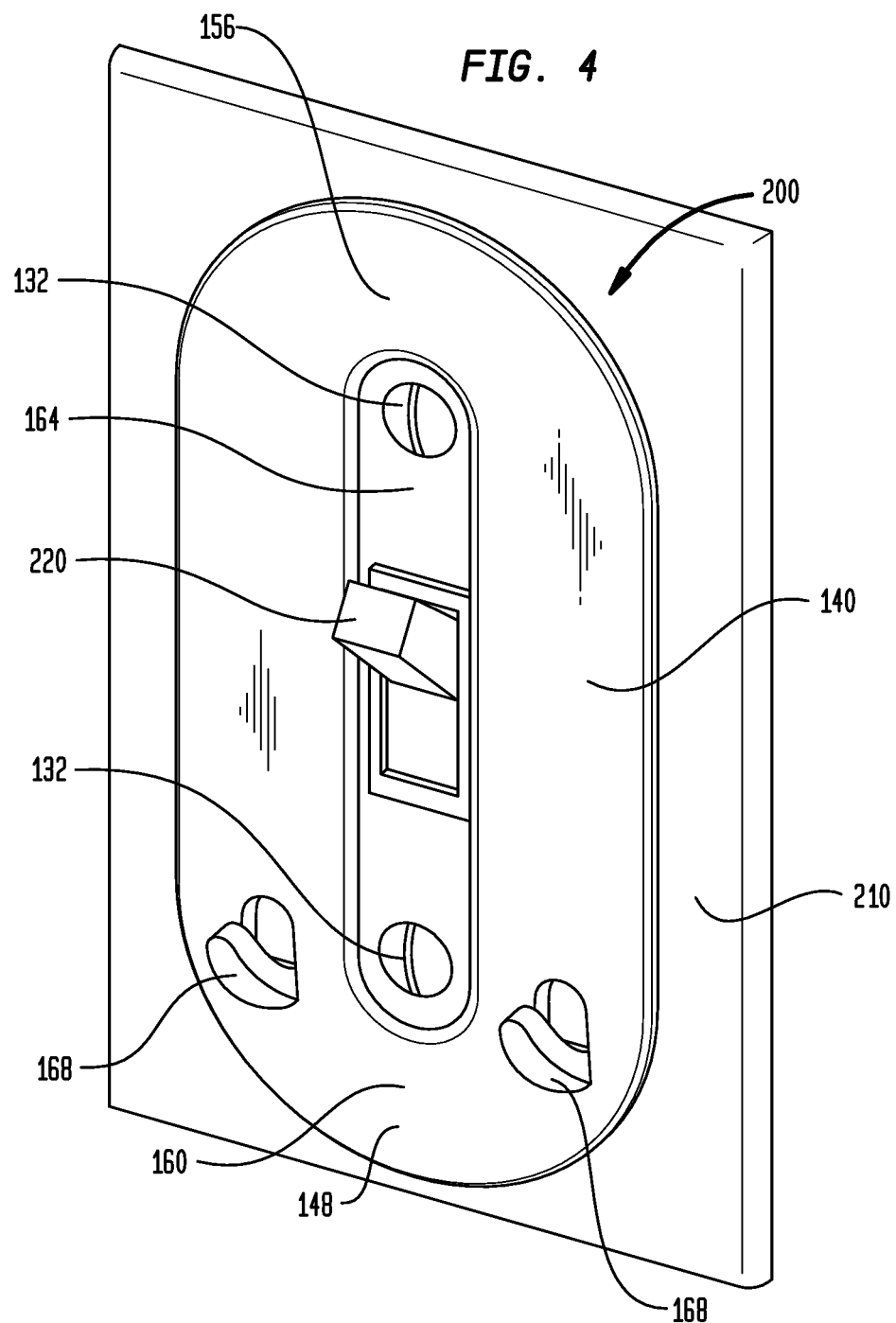

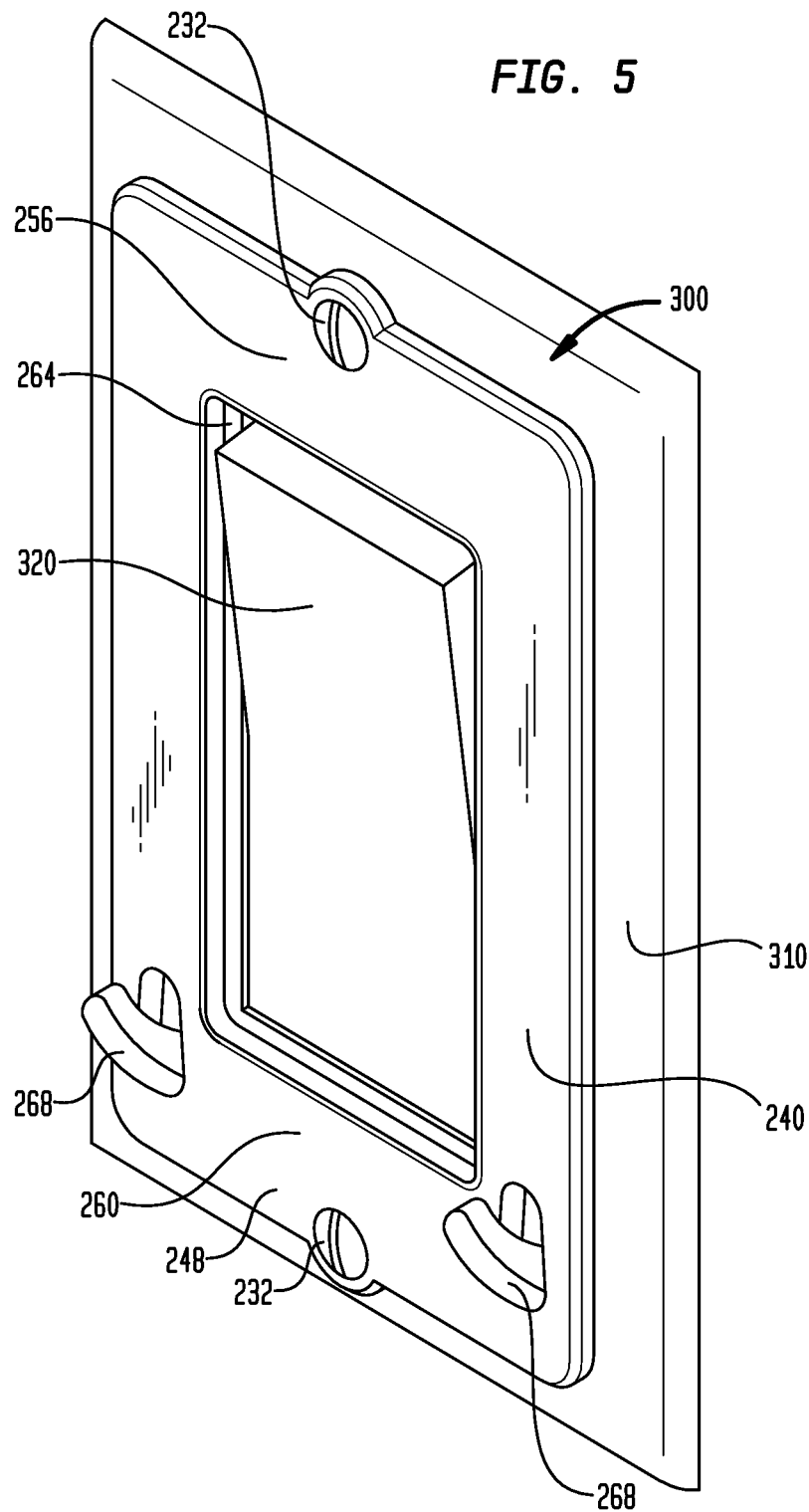

SWITCH PLATE ADAPTER

BACKGROUND

The present invention relates to adapters for switch plates, including light switch plates that comprise attachment means to an existing switch plate, one or more apertures and one or more protruding members, such as hooks, for storage of items, such as keys.

Many people live in apartments or other domiciles that include a multitude of switches having protective switch plates. Often, these protective plates can include one or more switches. Typically, two or more switches are arranged behind a single protective cover.

Often, people misplace their keys, such as their car keys or house keys after they enter their home, thus creating the need for a frustrating and prolonged search before leaving the home.

Further, the invention can be used to assist memory impaired individuals such as elderly people or Alzheimer's patients. By having a hook to hang an object proximal to a light switch ensures that a person will remember where the object was place and create a habitual behavior pattern to assist such individuals and prevent them from losing items.

Additionally, the invention can be used to assist young people such as teenagers. In such cases, the individual can use the invention to hang an item, such as keys or a cell phone, in the same place, near a light switch, thereby creating and promoting a responsible behavior pattern.

The present invention solves this problem by integrating at least one protruding member, such as a hook into a light switch plate cover. Thus, when a user enters a building, domicile, or any room, the user can hang keys or other important items on the device. When the user leaves the area, the keys or other items are conveniently available near the switch. The present invention is also advantageous in that it can be attached to any existing switch plate without having to remove the existing plate. The device can be both removable and movable between locations for convenience and efficiency.

SUMMARY OF THE INVENTION

In one aspect of the invention an apparatus comprises a.

In one aspect of the invention, a switch plate adapter comprises a body. The body includes a front surface, a back surface, a top end, a bottom end, a first aperture, and at least one hook protruding from the body. The body can be mounted to a switch plate cover such that a switch can protrude through the first aperture.

In an embodiment of the invention, an adhesive material is adhered to at least a portion of the back surface. The apparatus can be adhesively affixed to a switch plate cover.

In certain embodiments, the adhesive material is a layer of pressure sensitive adhesive.

In other embodiments, the layer of pressure sensitive adhesive is substantially an acrylic polymer.

In yet other embodiments, the adhesive material is a permanent adhesive.

In some embodiments, said adhesive material is a removable adhesive such that the adapter can be removed without damaging the switch plate cover.

In other embodiments, a second aperture is disposed proximally to the top end and a third aperture disposed proximally to the bottom end. The second and third apertures can be used to mount the adapter to a switch plate using screws.

In yet other embodiments, a plurality of second apertures can be disposed proximally to the top end and a plurality of third apertures disposed proximally to the bottom end. The plurality of second and third apertures can be used to mount the adapter to a switch plate cover having a plurality of switches using a plurality of screws.

In certain embodiments, the adapter body includes a plurality of hooks.

In some embodiments, a plurality of hooks is disposed proximally to the bottom end of the body.

In yet other embodiments, the at least one hook is disposed on the front surface proximate to the bottom end of the body.

In some embodiments, the body can be rectangular, elliptical, or oval.

Is some embodiments, the at least one hook can be integrally molded with the body In another aspect of the invention, a kit comprises a light switch cover; an adapter including a body, the body can have at least one aperture and at least one protruding hook; means for attaching the adapter to the cover; and a package for containing and displaying the adapter system kit.

In one embodiment of this aspect, the means for attaching the adapter to the cover can be screws.

In another embodiment of this aspect, the means for attaching the adapter to the cover can be a hook and loop fastener system.

In certain embodiments, the means for attaching the adapter to the cover can be an adhesive.

BRIEF DESCRIPTION OF THE DRAWINGS

FIG. 2 depicts a front view of the embodiment shown in FIG. 1.

FIG. 3 depicts a side view of the embodiment shown in FIG. 1.

FIG. 4 depicts a perspective view of another embodiment of the switch plate adapter of the present invention.

FIG. 5 depicts a perspective view of another embodiment of the switch plate adapter of the present invention.

DETAILED DESCRIPTION

Figure 1:
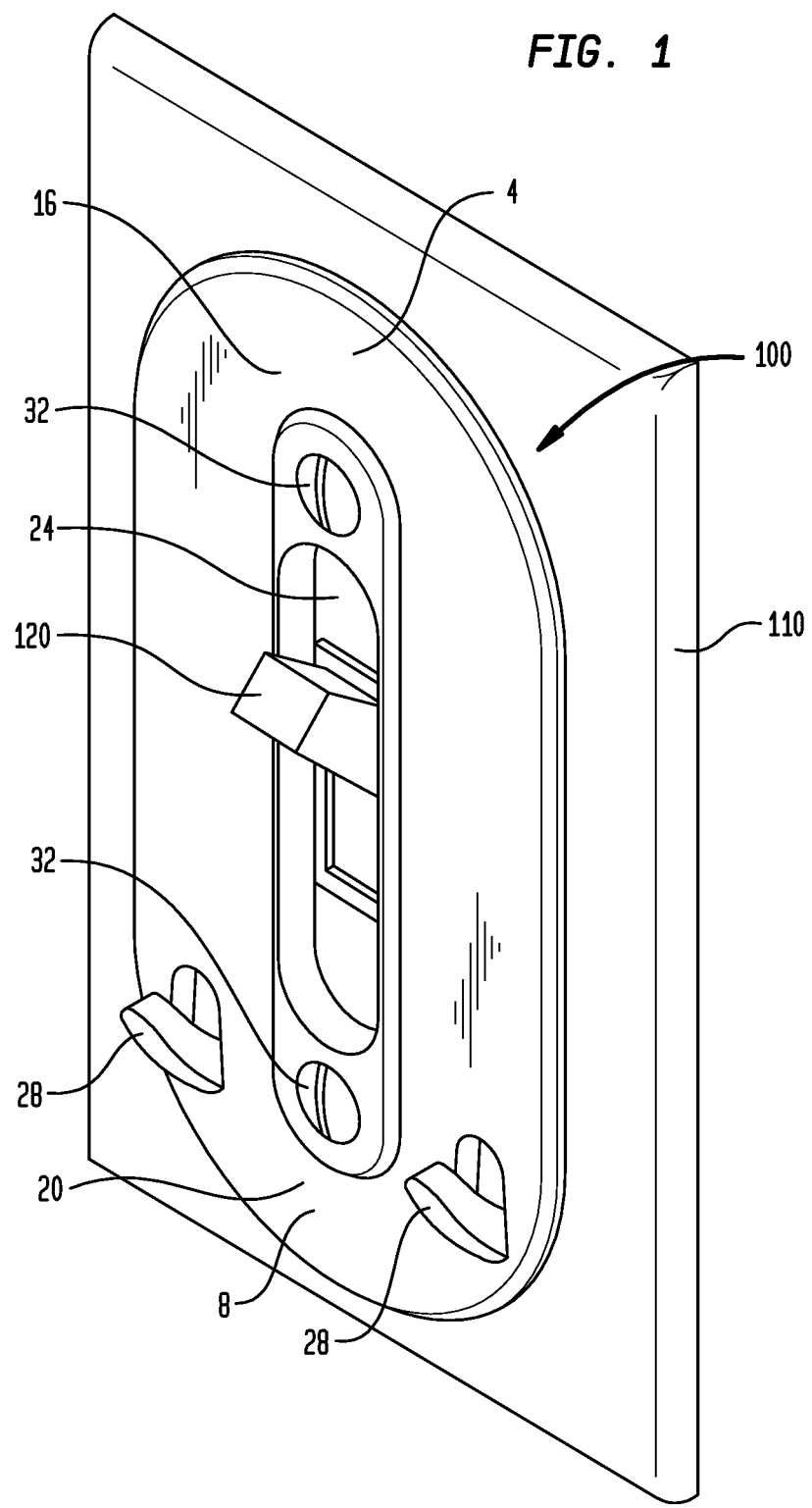
FIG. 1 depicts a perspective view of an embodiment of the switch plate adapter of the present invention.

As used herein, the term switch plate is defined as any protective cover protecting a switch or other electrical device. The terms switch plate and switch cover can be singular or plural and are used interchangeably herein.

As used herein, the terms switch plate adapter or adapter are used to define a device that is attached to a switch plate. These terms may be singular or plural and are used interchangeably herein.

As used herein a hook is defined as any protruding member that can be used to hang items, such as keys. A hook can be strait, curved, angled or any combination thereof. A hook can be a separate element or integrally molded with the body of an adapter.

As used herein, an aperture is a designed opening in an otherwise solid member. In this device, an aperture can function to allow for a through hole for an attachment means, such as a screw, or to allow for clearance such that the device fits over one or more features of a preexisting switch.

As used herein, an attachment means includes screws, nuts and bolts, adhesives, tapes, foams, hook and loop fastening systems (i.e. Velcro™) and the like. Attachment means for adapting or attaching the present invention, temporarily or permanently, removeably or non-removeably, to an existing switch plate will be known to those skilled in the mechanical or chemical arts.

As shown in FIGS. 1-3, in one non-limiting embodiment of the present invention, switch plate adapter 100 is mounted to standard switch plate 110. The adapter comprises body 4 which has outward facing front surface 8, back surface 12, a top end 16, bottom end 20, first aperture 24, and hooks 28 protruding from the body. In this embodiment, the body can be mounted to the switch via top and bottom apertures (screw holes not shown) by spaced apart screws 32 configured to fit a standard switch plate. Switch 120 protrudes through the first aperture allowing easy access to turn the switch on or off with the adapter in place. Any desirable number of hooks can be molded with the body or attached anywhere on the adapter body The adapter can be manufactured using standard methods such as machining or molding. Any suitable material can be used. It is preferable that the material is a non-conductive, fire retardant polymer suitable for use in proximity to electrical devices. Such materials and manufacturing methods will be known to those skilled in the mechanical or materials engineering arts. For example, the adapter 100 can be made from the same or different polymer that the switch plate is made from such as a phenolic resin. A combination of materials can be used to impart color or a decorative pattern which may be desirable as an accent or to match the adapter and the switch plate. In one embodiment, the adapter can be a glow-in-the dark material that allows a user to access the switch or the hooks in the dark or semi-dark.

In another non-limiting embodiment of the present invention, the top and bottom apertures and screws can be eliminated thus reducing the number of parts and costs. FIG. 4 depicts switch plate adapter 200 mounted to standard switch plate 210. The adapter comprises body 140 which has outward facing front surface 148, a back surface (not shown), a top end 156, bottom end 160, aperture 164, and hooks 168 protruding from the body. In this embodiment, the body 140 can be mounted to the switch via a fastening means such as adhesive or hook and loop fasteners. In this way, the adapter forms a temporary removable or permanent attachment with switch cover 210. Switch 220 protrudes through the aperture allowing for easy access to turn the switch on or off with the adapter in place. As described above, hooks 168 can be sized wide range to accommodate hanging items of various weights. Further, the hooks can be attached or molded integrally with the body such that any desirable number of hooks can be molded into the body or attached anywhere on the adapter body.

As shown in FIG. 5, in another non-limiting embodiment of the present invention, switch plate adapter 300 mounted to standard switch plate 310. The adapter comprises body 240 which has outward facing front surface 248, a back surface (not shown), a top end 256, bottom end 260, first aperture 264, and hooks 268 protruding from the body. In this embodiment, the body can be mounted to the switch via a fastening means such as adhesive or hook and loop fasteners or include apertures for screws 232. In this way, the adapter forms a temporary or removable, or permanent bond with switch cover 310. Switch 320 protrudes through the first rectangular aperture allowing easy access to turn the switch on or off with the adapter in place. The hooks 268 can be sized wide range to accommodate hanging items of various weights. Further, the hooks can be attached or molded integrally with the body such that a plurality of hooks can be molded into the body or attached thereto are available to the user. For example, the adapter can include one, two, four or six hooks. The hooks can be labeled or color coded for different users or for different purposes. For illustration purposes only, for example, 1=car keys, 2=boat keys, 3=house keys, and the like.

A plurality of geometries, configurations, and individual component configurations are contemplated within the scope of the present invention. For example, the adapter can accommodate any number of switches, such as a single, double or triple switch plate. The aperture for clearance of the switch and for attachment means when required can be any shape that allows for clearance of the switch and operation thereof and the body can be any shape such as rectangular, oval, mandolin shaped and the like.

As mentioned above, all of the components of the present invention can be manufactured using materials and manufacturing methods known to one of skill in the art of manufacturing or materials and process engineering.

Although the invention herein has been described with reference to particular embodiments, it is to be understood that these embodiments are merely illustrative embodiments and that other arrangements may be devised without departing from the spirit and scope of the present invention as defined by the disclosure herein.

What is claimed is:

1. A switch plate cover for mounting to a pre-existing switch plate comprising:

a body; said body including a front surface, a back surface, a top end, a bottom end, said body being sized to cover said pre-existing switch plate, wherein said top end and said bottom end substantially align with a top end and a bottom end of said pre-existing switch plate, a first aperture, and at least one hook protruding in a direction substantially perpendicular from said body, said at least one hook being disposed on said front surface proximate to said bottom end of said body, said at least one hook being integrally molded with said body, wherein said body can be mounted to said pre-existing switch plate such that a switch can protrude through said first aperture said body further including a second aperture disposed proximally to said top end and a third aperture disposed proximally to said bottom end, wherein said second and third apertures are used to mount said switch plate cover on a top surface of a pre-existing wall mounted switch plate with screws.

2. The switch plate cover of claim 1, further including a plurality of second apertures disposed proximally to said top end and a plurality of third apertures disposed proximally to said bottom end, wherein said plurality of second and third apertures are used to mount said switch plate cover on a top surface of a pre-existing wall mounted switch plate with screws.

* * * * *